Jan. 15, 1935. C. H. HAPGOOD 1,987,955
COW MILKING APPARATUS
Filed Sept. 4, 1931 2 Sheets-Sheet 1
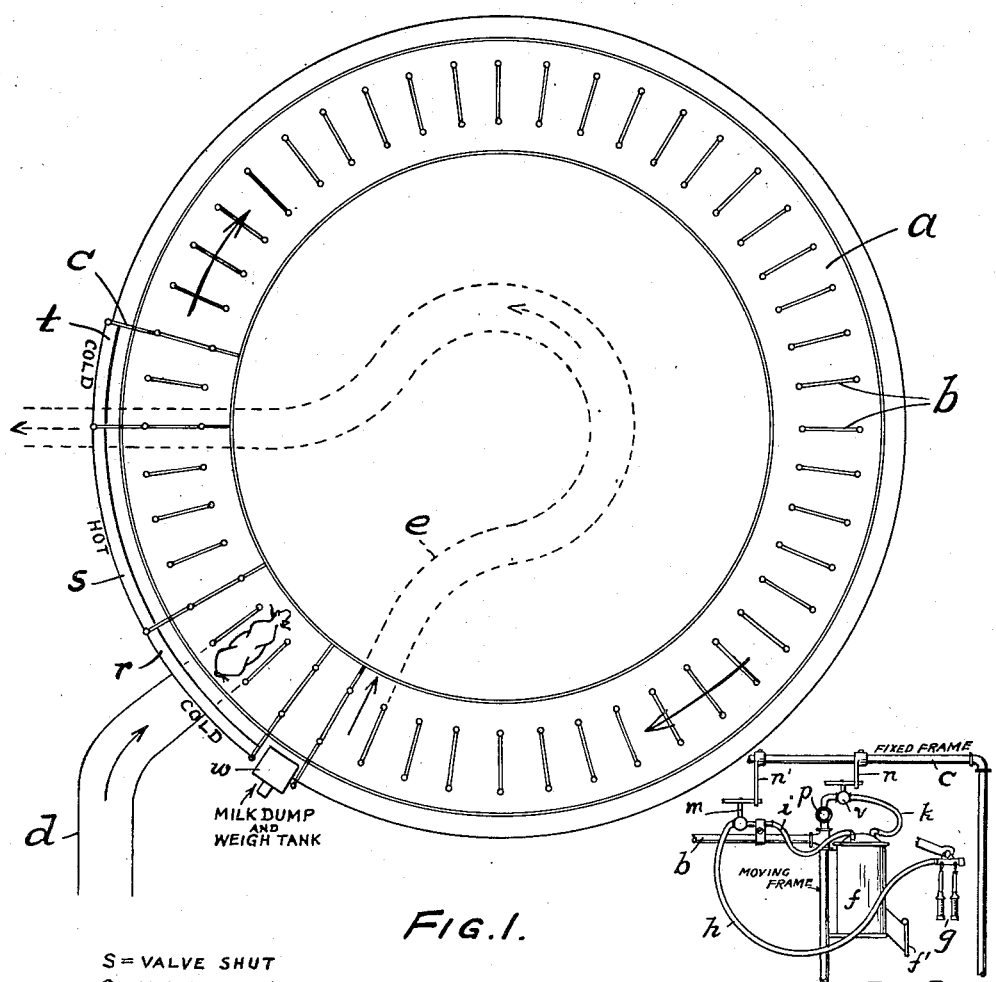
FIG.1.
FIG.3.
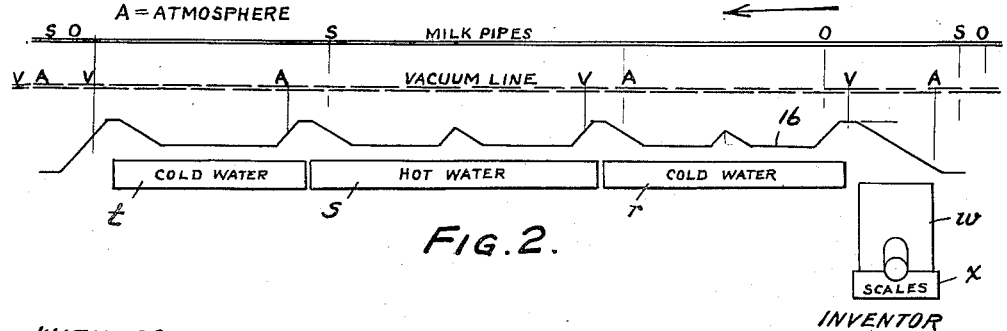
S = VALVE SHUT
O = VALVE OPEN
V = VACUUM
A = ATMOSPHERE
FIG.2.
WITNESS:
INVENTOR
Cyrus Howard Hapgood
BY
ATTORNEYS.

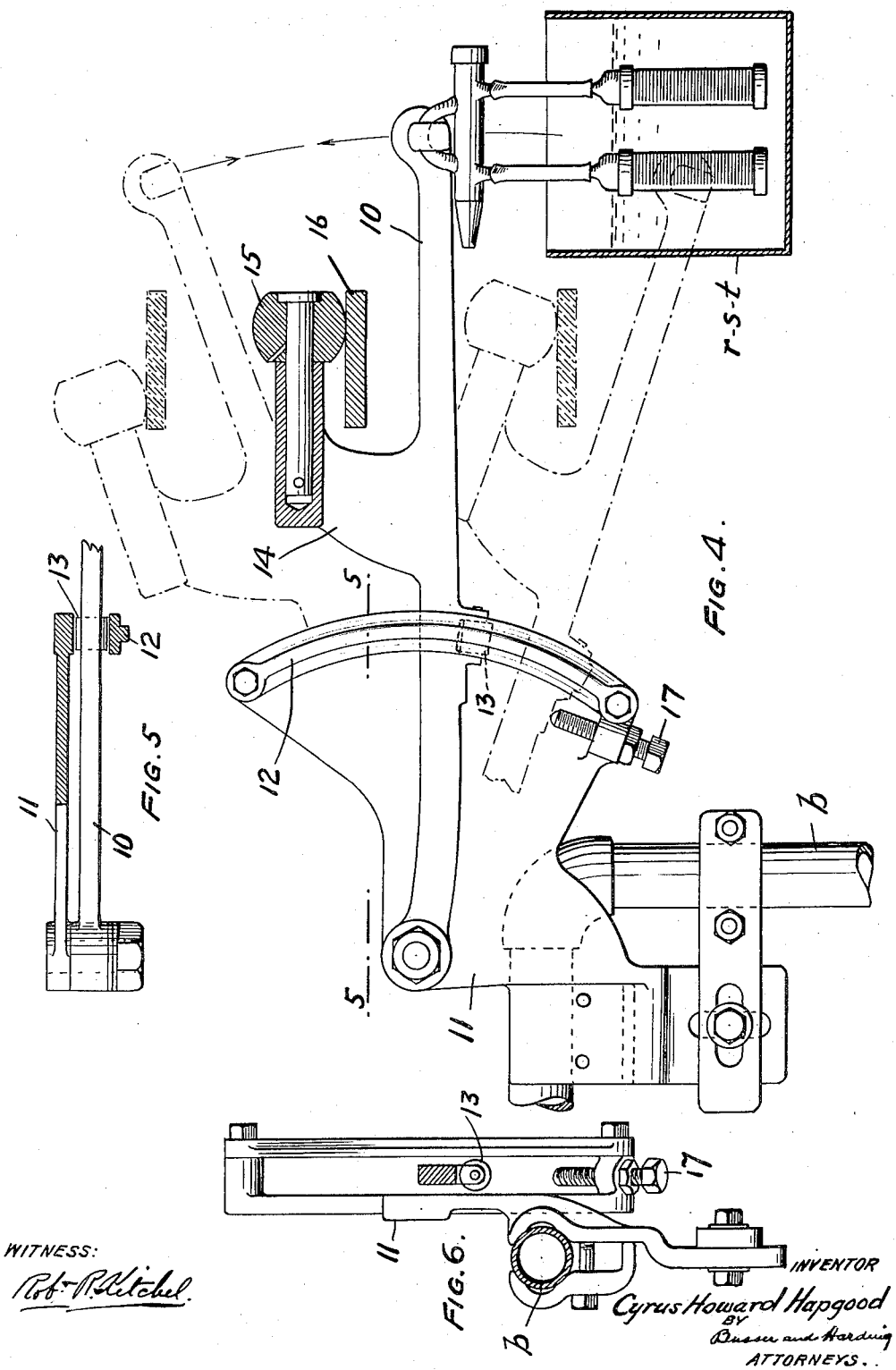

Patented Jan. 15, 1935

1,987,955

UNITED STATES PATENT OFFICE 1,987,955

COW MILKING APPARATUS

Cyrus Howard Hapgood, Nutley, N. J., assignor to The De Laval Separator Company, New York, N. Y., a corporation of New Jersey Application September 4, 1931, Serial No. 561,157

3 Claims. (Cl. 31—58)

In a patent issued to me December 30, 1930, No. 1,787,152, there is set forth a cow milking apparatus which includes a rotatable platform adapted to carry cows to be successively milked and milking machinery comprising a number of milking units on the platform adapted to be connected with a corresponding number of cows, the movement of the platform actuating means to render the milking units successively operable.

Each milking unit of this apparatus comprises a milk pail, a hose connected with the pail, an air valve movable into position to connect the hose with either vacuum or pressure (conveniently the atmosphere), a set of double chambered teat cups, hose connections between the teat cups and the pail, and a milk valve in said hose connections adapted to be opened or closed, and other mechanism, not of interest in connection with the present invention, including means for producing pulsations in the outer chambers of the teat cups. During the milking operation the milk valve is open and the air valve connects the pail with vacuum, causing the milk to be drawn through the teat cups into the pail. At the conclusion of milking the milk valve is closed, the teat cups are removed from the cow and hung on a hook on the end of a lever, and the air valve is moved into position to connect the pail with atmosphere, allowing a gate on the pail (closed during milking by the pressure of the atmosphere) to discharge the milk into a weigh tank.

Thereafter the lever carrying the teat cups is swung on its pivot to drop the teat cups into a cold water tank. The air valve is moved to connect the pail with vacuum and the milk valve on the hose connections between the teat cups and pail is opened, the vacuum then drawing cold water through the teat cups into the pail. The milk valve is then closed and then the air valve is moved to connect the milk pail with atmosphere, causing the cold water to be dumped into a gutter surrounding the rotary platform. The lever carrying the teat cups is swung to lift the teat cups out of the cold water tank.

A hot water tank is also provided and the milking unit is flushed out with hot water in the same way as it was flushed out with cold water.

The actuation of the valves (except in one instance) is automatic, as is also the actuation of the lever carrying the teat cups.

One objection to the said apparatus is that the teat cups must be hung on the hook of a lever when such hook is at an inconveniently high elevation. One object of the present invention is to provide means whereby the teat cups may be hung when the hook of the lever is at a conveniently low elevation and whereby they may be lifted and lowered to various levels during the water-flushing operations. Another object of the invention is to otherwise improve the construction of the means for suspending and operating the teat cups. Another object of the invention is to improve the water-flushing operation.

In the drawings, which show a preferred embodiment of the invention—

Fig. 1 is a plan view of the rotatable platform, the weigh tanks and flushing tanks and parts of the fixed and movable frames;

Fig. 2 is a diagram illustrating the operations constituting the flushing procedure;

Fig. 3 is a detail view of a milking unit including associated milk and air pipes;

Fig. 4 is a side elevation of the means for supporting and actuating the teat cups;

Fig. 5 is a section on the line 5—5 of Fig. 4; and

Fig. 6 is an end view of the teat cup supporting device of Fig. 4, partly broken away.

$a$ is a rotary table or platform carrying radially extending frames $b$ forming stalls for the cows and supports for the milking units. A fixed frame has reaches $c$ extending radially over the platform. $d$ and $e$ are walkways for the cows leading respectively to and from the rotary platform.

Each milking unit comprises a milk-receiving pail $f$ (see Fig. 3) having a discharge spout provided with a gate $f'$ adapted to be closed, by atmospheric pressure, when the pail is under vacuum and to freely open, under the pressure of the milk, when the pail is connected with atmosphere; a set of teat cups $g$ connected by a milk pipe $h$ and a milk hose $i$ with the pail, and an air hose $k$ extending from the pail to an air valve $v$, which is adapted to be moved into position to connect the pail either with a vacuum pipe $p$ or with atmosphere; and a milk valve $m$ between pipe $h$ and hose $i$. The milking units turn with the platform and the valves $v$ and $m$ may be actuated, at suitable intervals, by means of actuators $n$, $n'$, on the fixed frame $c$. The construction and operation of the actuators is fully set forth in Patent No. 1,787,152.

Each set of teat cups is carried on one end of a lever 10, which is pivotally supported at its other end on a frame 11 secured to an element of the frame $b$ which rotates with the platform. Frame 11 includes a flat plate and a segmental bar 12 secured at its opposite ends to such plate and spaced therefrom. The bar 12 extends along an arc of a circle whose center is the pivot of lever 10 which latter extends between the plate and the bar. Lever 10 carries a roller 13, which is positioned between the plate and the bar. In case of any lateral stress on the lever, roller 13 will contact with the bar of the plate.

Lever 10 has an arm 14 carrying a bearing for the shaft of a roller 15, which rests upon and rolls along a cam 16, which extends along the water tanks. By means of an adjusting screw 17 on the frame 11, the lever is prevented from falling below a predetermined position before it reaches and after it passes beyond the cam track 16.

The water tanks comprise a cold water tank r, a hot water tank s, and a cold water tank t.

At the conclusion of milking the milk valve m, controlling the connection from the teat cups, through milk pipe h and hose i, to the pail f, is closed. This is preferably a manual operation but may be done by an actuator. The milk valve m is then opened to connect the teat cups with the pail f, thereby sucking any milk remaining in the teat cups and milk tubes into the pail. The milk valve m is then again closed, and air valve v is turned to close communication, through hose k, between the main vacuum line p and pail f and connect the pail with atmosphere. Thereupon the gate f' of the pail swings open and releases the milk into a tank w on the scales x. During the milk releasing operation, the lever 10 is lifted by the cam 16 into position to elevate the teat cups g to a sufficient height to enable them to clear the front end wall of the cold water tank r, after which the cam 16 allows the lever 10 to drop and submerge the teat cups in the cold water. During this operation the air valve v is turned to connect the pail with vacuum and the milk valve m is opened to connect the teat cups with the pail and thereby with vacuum, causing cold water to be sucked through the teat cups into the pail.

The cam 16 may be so shaped that, while the milking unit is thus being flushed with cold water, the teat cups may be momentarily lifted clear of the water to allow a shot of air to enter the teat cups and thereby assist in forcing the water through the teat cups and the pipe h and hose i.

Just before the teat cups reach the rear end of the cold water tank, they are lifted by the cam 16 out of the water and the air valve v is turned to connect the hose k and the milk pail with atmosphere, thereby allowing the water to be discharged from the pail.

The air valve v is then turned to connect the milk pail with vacuum and the cam 16 allows the teat cups to lower into the forward end of the hot water tank s. Hot water is now sucked through the teat cups into the pail, the cam 16 being so shaped, if desired, that, in the progress of the teat cups through the tank, one or more shots of air will be admitted to the teat cups.

While the teat cups are, by the cam 16, being lifted from the rear end portion of the hot water tank, the milk valve m is closed so as to shut off the connection, through the pail, of the teat cups with vacuum. The air valve v is connected with atmosphere to allow the discharge of hot water from the pail. The cam 16 then allows the teat cups to be lowered into the third or last (cold water) tank t for cooling the teat cups.

As the teat cups approach the rear end of tank t, the cam 16 lifts the teat cups above the level of tank t and carries them beyond the same and then lowers the teat cups to the lowest level. The air valve v is turned to connect the pail with vacuum; the milk valve m is opened to connect the teat cups with the pail, thereby sucking any water in the teat cups and milk tubes into the pail; the milk valve is then closed and the air valve is then moved to connect the pail with atmosphere to allow the pail to discharge any water contained therein, and the air valve v is then moved to connect the pail with vacuum preparatory to milking.

All or any of the described operations of valves m and v may be effected automatically by means of fixed actuators n and n'. These actuators may be constructed, and operated, in accordance with the disclosure of my said Patent No. 1,787,152, which contains, also, a full and complete disclosure of all mechanisms, not herein described, which is required to provide a complete milking apparatus.

Having now fully described my invention, what I claim and desire to protect by Letters Patent is:

1. In a cow milking machine comprising a rotatable platform, milking units, including sets of teat cups, mounted on the platform, pivoted levers mounted on the platform and adapted to carry the sets of teat cups, and a stationary liquid-containing tank extending along the platform: a stationary cam extending along the tank and by which said levers are guided, said cam having guiding surfaces at three elevations, the lower of which is adapted to position the lever convenient for suspension and removal of the teat cups, the higher of which is adapted to position suspended teat cups above the tank and the medium of which is adapted to hold the teat cups submerged in the liquid contained in the tank, said cam having also, along its surface of medium height, swells adapted to temporarily lift the teat cups above the liquid level in the tank during their progress therethrough.

2. In a cow milking machine comprising a rotatable platform, a milking unit, including a set of teat cups, a stationary flushing tank extending along the platform, and a pivoted lever adapted to carry a set of teat cups: a frame, comprising a flat plate, mounted on the platform and on which said lever is pivoted, a segmental bar extending along and spaced from said plate and between which and said plate said lever extends, and a roller carried by said lever and extending beyond the faces thereof respectively adjacent the plate and bar to prevent sliding contact, in the swinging movement of the lever, between it and the plate or bar.

3. In a cow milking machine comprising a rotatable platform; milking units mounted on the platform, each including a milk pail, a set of teat cups, a milk pipe between the pail and teat cups, an air pipe to the pail, a valve on the milk pipe, and a valve on the air pipe operable to connect the air pipe with either atmosphere or vacuum; and pivoted levers mounted on the platform and adapted to carry the sets of teat cups: a liquid-containing tank extending along the platform, means adapted to cooperate with said levers to lift the teat cups over the ends of said tank and submerge them in the liquid contained therein, and actuating mechanism adapted, during the passage of a set of teat cups through the tank, to open the corresponding air valve to vacuum and open the corresponding milk valve, said means being also adapted, during the passage of a set of teat cups through the tank, to temporarily lift the teat cups clear of the liquid contained therein to allow a shot of air to enter the teat cups and assist in forcing the liquid through the teat cups and the milk pipe into the pail.

CYRUS HOWARD HAPGOOD.